US012603820B2

(12) United States Patent
Whdan et al.

(10) Patent No.: US 12,603,820 B2
(45) Date of Patent: Apr. 14, 2026

(54) SYSTEM AND METHOD FOR CELLULAR NETWORK PREDICTION MODEL ANALYSIS

(71) Applicant: Boost SubscriberCo L.L.C., Englewood, CO (US)

(72) Inventors: Ahmed Awwad Whdan, Centennial, CO (US); Arnold Agcaoili, Littleton, CO (US); Satish Kumar Sharma, Denver, CO (US); Yifei Zhao, New York, NY (US); Carl Rickard Hardy Soederberg, Littleton, CO (US)

(73) Assignee: Boost SubscriberCo L.L.C., Englewood, CO (US)

( * ) Notice: Subject to any disclaimer, the term of this patent is extended or adjusted under 35 U.S.C. 154(b) by 0 days.

(21) Appl. No.: 18/669,100

(22) Filed: May 20, 2024

(65) Prior Publication Data

US 2025/0358197 A1      Nov. 20, 2025

(51) Int. Cl.
*H04L 41/147* (2022.01)
*H04L 41/16* (2022.01)

(52) U.S. Cl.
CPC ............ *H04L 41/147* (2013.01); *H04L 41/16* (2013.01)

(58) Field of Classification Search
CPC .............................. H04L 41/147; H04L 41/16
See application file for complete search history.

(56) References Cited

U.S. PATENT DOCUMENTS

| | | | | |
|---|---|---|---|---|
| 9,900,790 B1 * | 2/2018 | Sheen | ................. | H04L 41/5009 |
| 2015/0339572 A1 * | 11/2015 | Achin | ...................... | G06N 5/04 |
| | | | | 706/46 |
| 2018/0046926 A1 * | 2/2018 | Achin | .................... | G06F 9/5011 |
| 2020/0394533 A1 * | 12/2020 | Ramalingam | ........... | G06F 18/25 |
| 2021/0344582 A1 * | 11/2021 | Samadi | ................... | H04L 43/14 |
| 2022/0110021 A1 * | 4/2022 | Livne | ............... | H04W 28/0942 |
| 2023/0199519 A1 * | 6/2023 | Singh | .................... | H04W 28/16 |
| | | | | 455/414.1 |
| 2024/0265273 A1 * | 8/2024 | Sun | .......................... | G06N 5/022 |
| 2024/0393262 A1 * | 11/2024 | Hong | ................. | G01N 21/9503 |

FOREIGN PATENT DOCUMENTS

WO      WO-2023131141 A1 *   7/2023   ............ H04W 24/02

* cited by examiner

*Primary Examiner* — Philip C Lee
(74) *Attorney, Agent, or Firm* — Seed Intellectual Property

(57)      ABSTRACT
Systems and methods are directed towards determining an optimum network prediction model to employ to predict traffic loads on target nodes. A plurality of possible network prediction models and a plurality of target requirements in which to assess the plurality of possible network prediction models are selected. The plurality of target requirements are then ranked for the target nodes. For each corresponding possible network prediction model of the plurality of possible network prediction models, a total score is calculated based on scores of each corresponding target requirement and the rankings of each corresponding target requirement. An optimum network prediction model is determined from the plurality of possible network prediction models for the target nodes based on the total score of each of the plurality of possible network prediction models. The optimum network prediction model is then employed to predict the traffic loads on the target nodes in the cellular network.

18 Claims, 4 Drawing Sheets

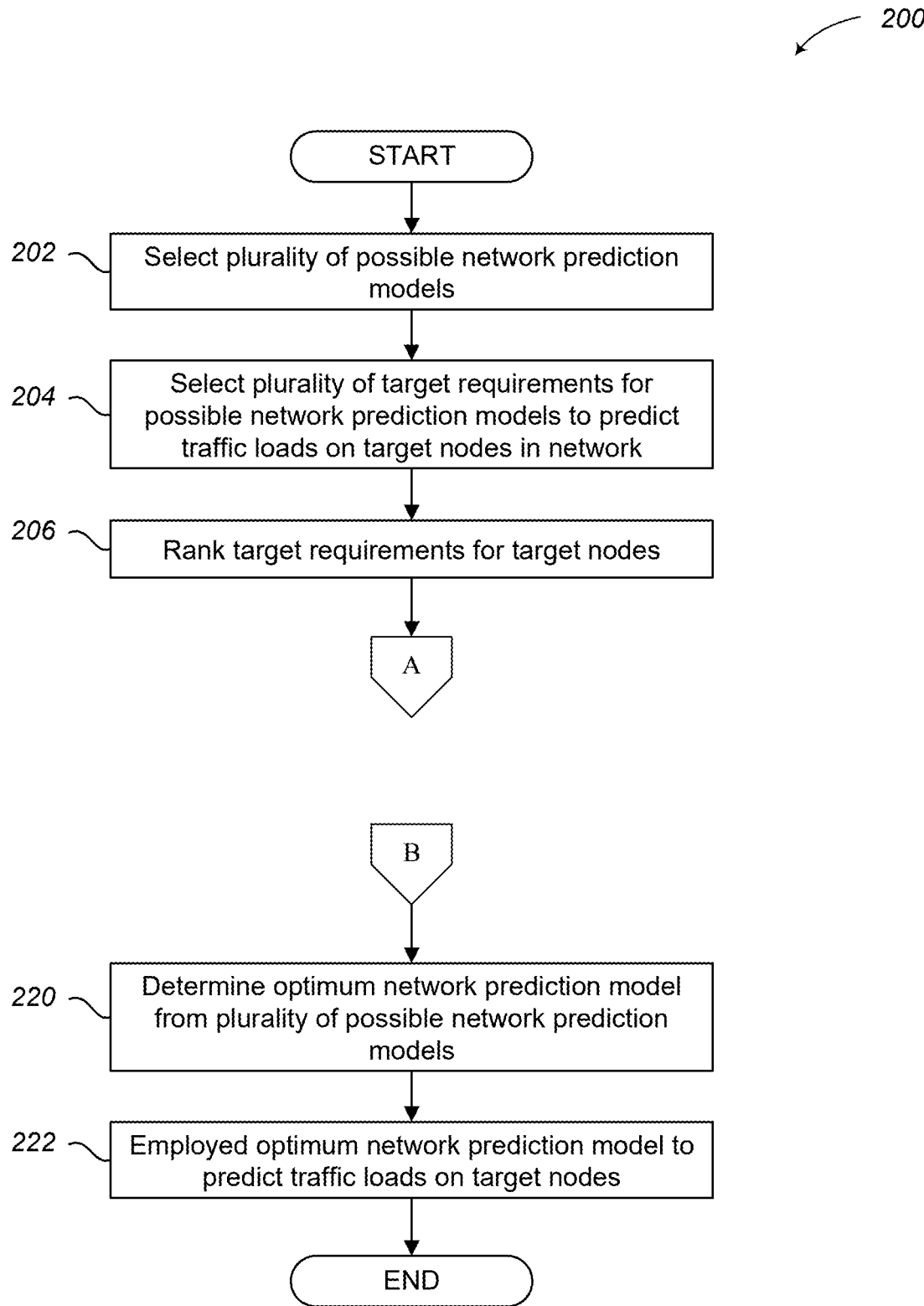

*200*

START

202 — Select plurality of possible network prediction models

204 — Select plurality of target requirements for possible network prediction models to predict traffic loads on target nodes in network 206 — Rank target requirements for target nodes

A

B

220 — Determine optimum network prediction model from plurality of possible network prediction models 222 — Employed optimum network prediction model to predict traffic loads on target nodes

END

*FIG. 2A*

SYSTEM AND METHOD FOR CELLULAR NETWORK PREDICTION MODEL ANALYSIS

BACKGROUND

People are becoming more reliant on the speed, efficiency, and availability of cellular networks. Recently, one advancement in cellular network technology has been to move many of the network functions associated with managing wireless network communications to cloud computing resources, rather than dedicated servers. Accordingly, cloud computing resources are often dedicated for the cellular network. But dedication of such cloud computing resources can result in underutilized or overutilized resources depending on the overall use or load of the network. As a result, resources are wasted when underutilized and the cellular network can become slow or inefficient when overutilized. Unfortunately, predicting whether resources will be underutilized or over-utilized can be difficult, especially as different types of resources are subject to different loads in different situations. It is with respect to these and other considerations that the embodiments described herein have been made.

BRIEF SUMMARY

Embodiments are directed to systems and methods for determining an optimum network prediction model to employ to predict traffic loads on target nodes. A plurality of possible network prediction models and a plurality of target requirements in which to assess the plurality of possible network prediction models are selected. Examples of the possible network prediction models may include ARIMA models, PROPHET models, LSTM models, etc. And examples of the target requirements may include accuracy of the corresponding possible network prediction model, seasonality incorporated into the corresponding possible network prediction model, manual input into the corresponding possible network prediction model, multi-variable input into the corresponding possible network prediction model, and user ease of use of the corresponding possible network prediction model.

The plurality of target requirements are then ranked for the target nodes. For each corresponding possible network prediction model of the plurality of possible network prediction models, a total score is calculated based on scores of each corresponding target requirement and the rankings of each corresponding target requirement. An optimum network prediction model is determined from the plurality of possible network prediction models for the target nodes based on the total score of each of the plurality of possible network prediction models. In some embodiments, the optimum network prediction model is then employed to predict the traffic loads on the target nodes in the cellular network.

BRIEF DESCRIPTION OF THE DRAWINGS

Non-limiting and non-exhaustive embodiments are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings:

FIGS. 2A-2B illustrate a logical flow diagram showing one embodiment of a process for dynamically determining an optimum network prediction model to predict traffic loads on target nodes in a cellular network in accordance with embodiments described herein.

DETAILED DESCRIPTION

The following description, along with the accompanying drawings, sets forth certain specific details in order to provide a thorough understanding of various disclosed embodiments. However, one skilled in the relevant art will recognize that the disclosed embodiments may be practiced in various combinations, without one or more of these specific details, or with other methods, components, devices, materials, etc. In other instances, well-known structures or components that are associated with the environment of the present disclosure, including but not limited to the communication systems and networks, have not been shown or described in order to avoid unnecessarily obscuring descriptions of the embodiments. Additionally, the various embodiments may be methods, systems, media, or devices. Accordingly, the various embodiments may be entirely hardware embodiments, entirely software embodiments, or embodiments combining software and hardware aspects.

Throughout the specification, claims, and drawings, the following terms take the meaning explicitly associated herein, unless the context clearly dictates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, actions, or characteristics of the present disclosure, and are not limited to the same or different embodiments unless the context clearly dictates otherwise. Furthermore, the described features, structures, functions, limitations, actions, or characteristics may be combined in any suitable manner in accordance with this disclosure, and references to "in one embodiment," "in another embodiment," "in various embodiments," "in some embodiments," "in other embodiments," etc., do not preclude the combination of the features, structures, functions, limitations, actions, or characteristics in any of the embodiments described herein. Accordingly, embodiments described herein can be combined in any combination unless the context clearly dictates otherwise.

As used herein, the term "or" is an inclusive "or" operator, and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context clearly dictates otherwise. In addition, throughout the specification, the meaning of "a," "an," and "the" include singular and plural references.

Figure 1:
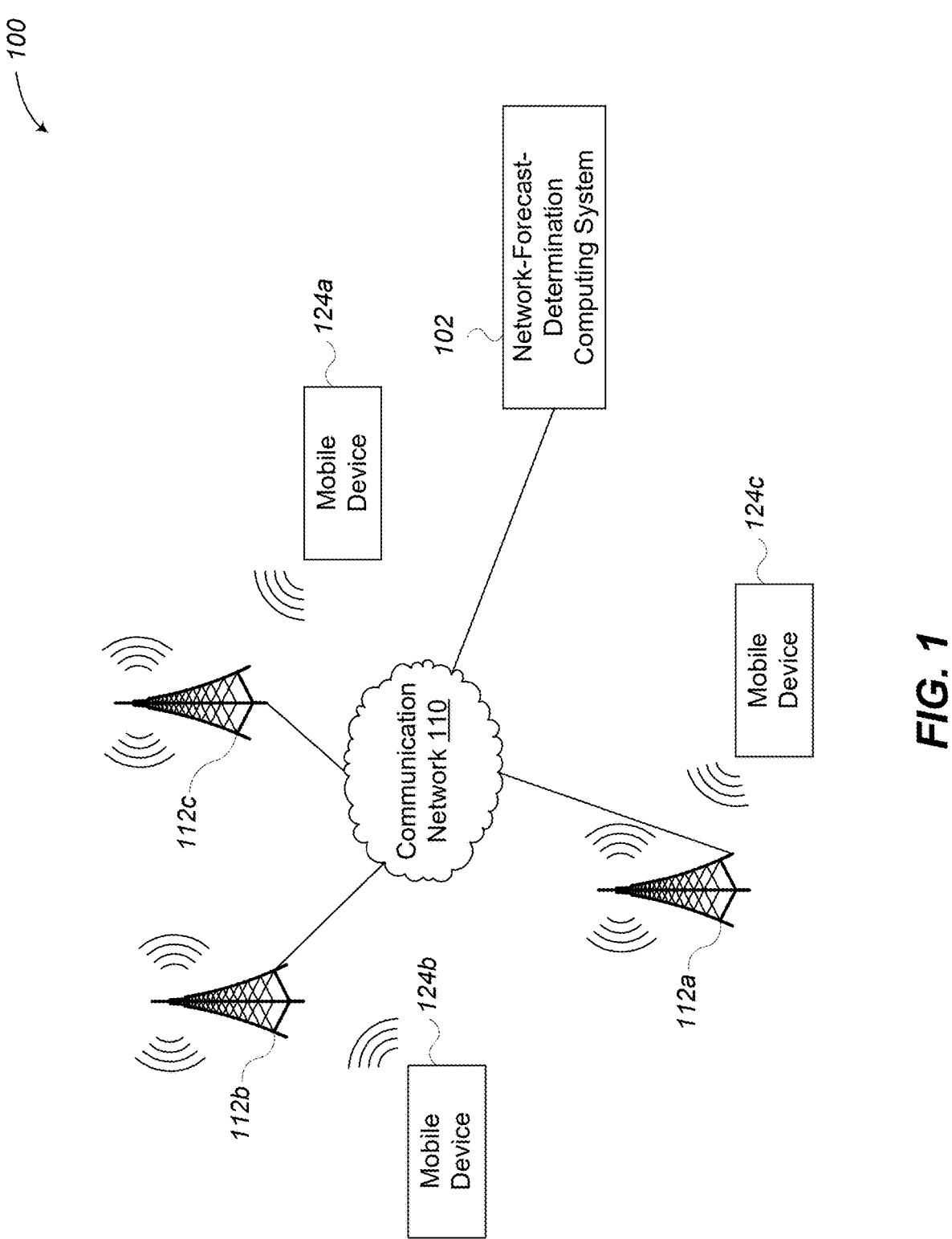
FIG. 1 illustrates a context diagram of an environment for dynamically determining an optimum network prediction model to predict traffic loads on target nodes in a cellular network in accordance with embodiments described herein.

FIG. 1 illustrates a context diagram of an environment 100 for dynamically determining an optimum network prediction model to predict traffic loads on target nodes in a cellular network in accordance with embodiments described herein. Environment 100 includes a plurality of cell towers 112a-112c, a plurality of mobile devices 124a-124c, a network-forecast-determination computing system 102, and a communication network 110.

The cell towers 112a-112c are cellular towers that together provide the hardware infrastructure of a cellular communications network, e.g., a 5G cellular communications network. The cell towers 112a-112c may include or be in communication with base stations, radio back haul equipment, antennas, or other devices, which are not illustrated for ease of discussion. In various embodiments, the cell towers 112a-112c may communicate with each other via communication network 110. Communication network 110 includes one or more wired or wireless networks, which may include a series of smaller or private connected networks that carry information between the cell towers 112a-112c.

The mobile devices 124a-124c are computing devices that receive and transmit cellular communications with the cell towers 112a-112c. Mobile devices 124a-124c may be referred to as user devices, mobile computing devices, user mobile devices, user equipment, or other similar terminology. Examples of mobile devices 124a-124c may include, but are not limited to, mobile phones, smartphones, tablets, cellular-enabled laptop computers, or other computing devices that can communicate with a cellular network.

The network-forecast-determination computing system 102 is a server, computing device, cloud computing environment, or some other computing system configured to rank and score a plurality of target requirements for a plurality of possible network prediction models to determine an optimum network prediction model to employ to predict traffic loads on target nodes in a cellular network. The predicted traffic loads on the target nodes may be any relevant key performance indicator regarding the status, utilization, or load on the target nodes. Examples of predicted traffic loads (or key performance indicators of nodes) may include downlink data volume of a node, uplink data volume of a node, downlink physical resource block utilization, uplink physical resource block utilization, radio resource control, etc.

Nodes may include distributed units (DUs), central units (CUs), sectors, cells, radio units (RUs), or other components of the cellular communications network. Cells provide a defined frequency spectrum for a specific sector, where sectors are geographical areas (also referred to as coverage areas) serviced by the cellular communications network. RUs are configured to provide the antenna and radio functions for a cell to communication with user devices. DUs provide real-time support for lower layers of the protocol stack for cellular communications, such as the radio link control (RLC) layer and the medium access control (MAC) layer. CUs may provide support for higher layers of the protocol stack for cellular communications, such as the service data adaptation protocol (SDAP) layer, the packet data convergence control (PDCP) layer, and the radio resource control (RRC) layer. In some embodiments, the DUs and the CUs may be executed as virtual instances within a data center environment. Collectively, the RUs, the DUs, and the CUs provide the structural aspects for the cells of the network to facilitate communications between user devices and the network. In some embodiments, the cells may include the RUs, DUs, and CUs, that support a defined frequency spectrum for a specific sector. Accordingly, the network-forecast-determination computing system 102 may employ embodiments described herein to determine which network prediction model of a plurality of models to employ to predict traffic loads on one or more DUs, one or more CUs, one or more sectors, one or more cells, one or more RUs, or some combination thereof. Such predictions can then be used to increase or decrease (e.g., scale up or scale down) the number of DUs, the number of CUs, the number of sectors, the number of cells, the number of RUs, or some combination thereof. Further embodiments are described in more detail below.

Figure 2B:
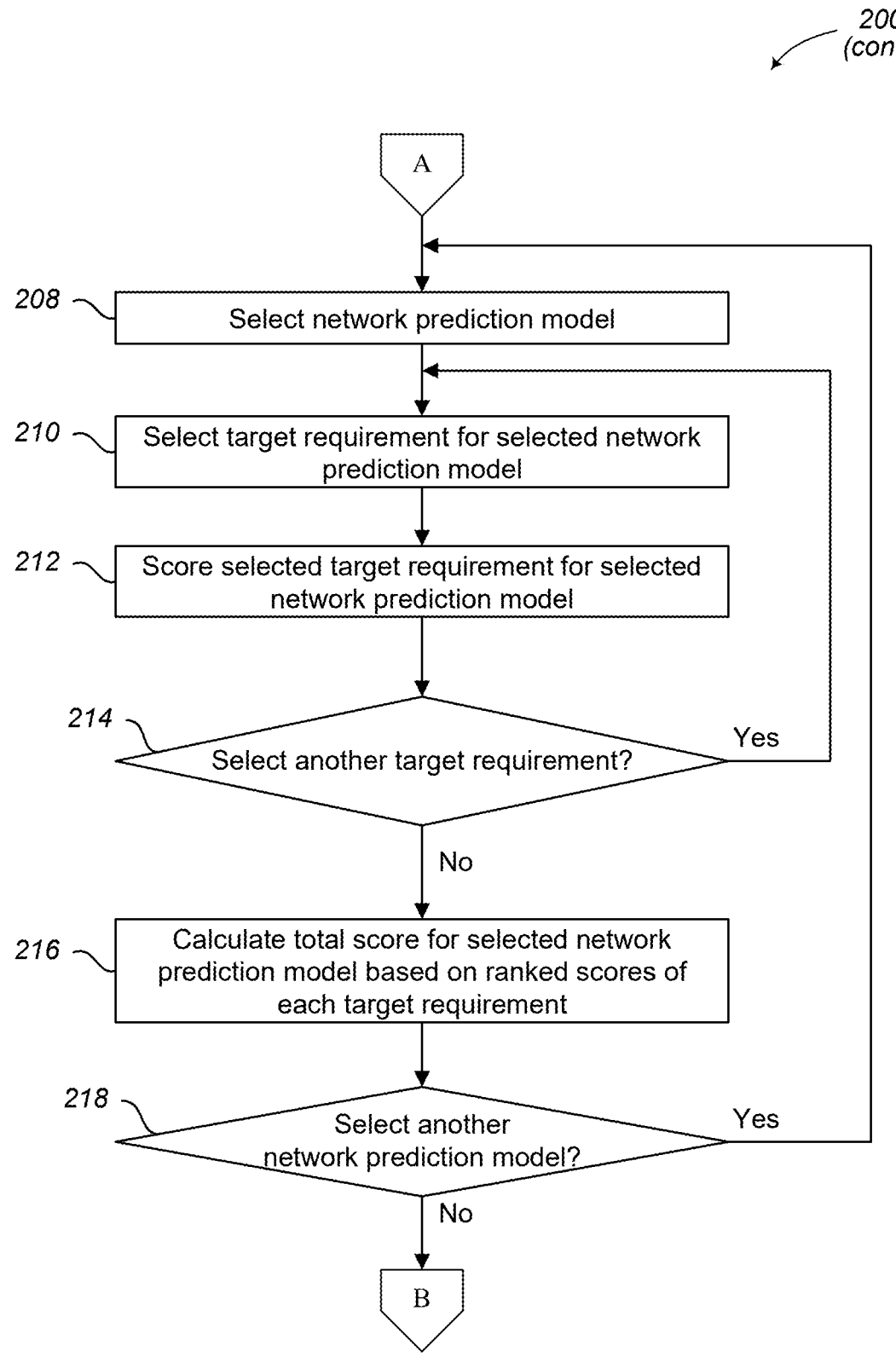

The operation of certain aspects will now be described with respect to FIGS. 2A-2B. FIGS. 2A-2B illustrate a logical flow diagram showing one embodiment of a process 200 for dynamically determining an optimum network prediction model to predict traffic loads on target nodes in a cellular network in accordance with embodiments described herein. In at least one of various embodiments, process 200 may be implemented by or executed via circuitry or on one or more computing devices, such as network-forecast-determination computing system 102 in FIG. 1.

Process 200 begins, after a start block on FIG. 2A, at block 202, where a plurality of possible network prediction models are selected. The possible network prediction models are machine learning, artificial intelligence, or other learning mechanisms that can predict traffic loads (or key performance indicators) on nodes in a cellular network. Examples of possible network prediction models may include, but are not limited to, autoregressive integrated moving average (ARIMA) models, PROPHET models (developed by Facebook®), long short-term memory (LSTM) models, etc.

In general, ARIMA is a statistical analysis model that uses time series data to either better understand the data set or to predict future trends. Some advantages of ARIMA include: 1) model fits various patterns, 2) easy for users to implement and interpret results, 3) fast model training speed, etc. But some disadvantages of ARIMA include: 1) model is not designed for multivariate data, 2) model assumes that the data is normally distributed and with constant residual, 3) model not designed for saturating trend, etc.

In general, PROPHET is model that can be used for forecasting time series data (e.g., traffic on nodes) based on an additive model where non-linear trends are fit with yearly, weekly, and daily seasonality, including holidays. Some advantages of PROPHET include: 1) model accepts manual special time and seasonality, 2) interpretable decomposition, 3) model is robust to missing values and outliers, 4) model is relatively computationally efficient, 5) model does not require stationary data, etc. But some disadvantages of PROPHET include: 1) model results are generally below par for predictive performance, 2) model is generally only appropriate for univariate time series, 3) model cannot incorporate all covariates, etc.

LSTM is a special type of Recurrent Neural Network (RNN). Briefly, LSTM is a deep learning, sequential neural network that allows information to persist, which is capable of handling the vanishing gradient problem. Some advantages of LSTM include: 1) model can handle multivariate data, 2) model can learn long-term dependencies, 3) model avoids the vanishing gradient problem, 4) model can handle noisy or missing data well, etc. But some disadvantages of LSTM include: 1) model is computationally expensive, 2) more prone to overfitting, 3) model results are harder to interpret and explain by a user, 4) model suffers from gradient explosion problem, etc.

Process 200 proceeds, after block 202, to block 204, where a plurality of target requirements are selected for the plurality of possible network prediction models to predict traffic loads on target nodes in a cellular communication network. The target requirements are aspects or characteristics of the possible network prediction models in which a user would like the possible network prediction models to use or incorporate. Example target requirements may include: 1) multivariate/multivariable (i.e., is the network prediction model multivariate (or multivariable) or not?), 2) manual input (i.e., does the network prediction model accept manual input?), 3) seasonality (i.e., does the network prediction model incorporate seasonality?), 4) accuracy (i.e., what is the accuracy of the network prediction model?), 5) cost (i.e., is the model computationally resource expensive?), 6) flexibility (i.e., is the model easy for a user to use and interpret results?), 7) availability of tuning parameters or sliding windows, 7) size of data set (i.e., does the model sufficiently handle large data sets?), etc.

A user or administrator may select which target requirements to consider for the target nodes. In some embodiments, the target nodes may also be selected by a user, an administrator, or pre-defined based on the selected plurality of possible network prediction models. The target nodes may include specific target nodes, specific types of nodes, nodes in particular markets or geographical areas, etc., or some combination thereof. As noted above, nodes may be DUs, CUs, sectors, cells, RUs, or other components of a cellular network. Accordingly, the selected one or more nodes may be a specific type of node (e.g., all DUs or all CUs, etc.) or a combination of different node types (e.g., DUs and CUs). In various embodiments, the one or more target nodes may be selected based on the geography or market that they support (e.g., all DUs that support cellular communications in the Denver metropolitan area, but not DUs that support cellular communications outside of the Denver metropolitan area). Other criteria or combinations of criteria may also be used to select the one or more target nodes. For example, a plurality of cells for a specific sector and the RUs, DUs, and CUs supporting those cells may be selected as target nodes, while not selecting other cells for other sectors.

Process 200 continues, after block 204, at block 206, where the plurality of target requirements are ranked for the target nodes. A user or administrator may select the rankings for the plurality of target requirements depending on the specific target nodes, the type of target nodes, the market or geographical area associated with the target nodes, etc. In some embodiments, the rankings may be considered as an order of importance, e.g., a first target requirement has a highest importance, a second target requirement has a second highest importance, and so on. In other embodiments, the rankings may be weighted values (multipliers or percentages) associated with the target requirements, e.g., a first target requirement may have a rank or weight of 50%, a second target requirement may have a rank or weight of 20%, and so on. The specific ranking or weighted values may be selected or assigned by the user or administrator. Because different traffic loads may impact different nodes in different ways, different target requirements or different rankings can be used for different target nodes.

Process 200 proceeds, after block 206, to block 208 in FIG. 2B, where a network prediction model is selected from the plurality of possible network prediction model. In various embodiments, each of the plurality of possible network prediction models are selected in an ordered manner such that each network prediction model is selected for further processing.

Process 200 continues, after block 208, at block 210, where a target requirement is selected for the selected network prediction model. In various embodiments, each of the plurality of target requirements are selected in an ordered manner such that each target requirement is selected for further processing.

Process 200 proceeds, after block 210, to block 212, where the selected target requirement is scored for the selected network prediction model. In some embodiments, the score may be a graded score, such as "good," "average," "poor." In other embodiments, the score may be a numerical value with higher values indicating that the selected network prediction model supports or achieves the target requirement and lower values indicating that the selected network prediction model does not support or does not achieve the target requirement.

In some embodiments, a user or administrator may select or assign the score for the selected target requirement for the selected network prediction model. For example, if the target requirement is "flexibility" (i.e., is the model easy for a user to use and interpret results?) and the selected network prediction model is an LSTM model, the user may assign a low score for the target requirement because LSTM model results are often more difficult for a user to interpret. But if the target requirement is "flexibility" (i.e., is the model easy for a user to use and interpret results?) and the selected network prediction model is an ARIMA model, the user may assign a high score for the target requirement because ARIMA model results are often easier for a user to interpret.

Process 200 continues, after block 212, at decision block 214, where a determination is made whether another target requirement is selected. As noted above, each of the plurality of target requirements may be selected and processed for the selected network prediction model. If another target requirement is to be selected, process 200 loops to block 210; otherwise, process 200 flows to block 216.

At block 216, a total score is calculated for the selected network prediction model based on the ranked scores of each target requirement. In various embodiments, the score for each target requirement is combined with the ranking for that target requirement to create a ranked score for that target requirement, and then all ranked scores are aggregated together. In one example, the score for each target requirement is multiplied by the weighted (ranked) value for that target requirement to create a weighted score for that target requirement, and then all weighted scores are summed together. Other techniques may also be employed to calculate the ranked scores for each target requirement and then combined to calculate a total score for the selected network prediction model.

Process 200 proceeds, after block 216, to decision block 218, where a determination is made whether another network prediction model is selected from the plurality of possible network prediction models. As noted above, each of the plurality of possible network prediction models may be selected, such that a total score is calculated for each possible network prediction model. If another network prediction model is to be selected, process 200 loops to block 208; otherwise, process 200 flows to block 220 in FIG. 2A.

At block 220 in FIG. 2A, an optimum network prediction model is determined from the plurality of possible network prediction models. In various embodiments, the optimum network prediction model is the network prediction model that has the highest or best total score compared to the other possible network prediction models.

Process 200 proceeds, after block 220, to block 222, where the optimum network prediction model is employed to predict traffic loads on the target nodes. In various embodiments, historical load data on the target nodes may be input into the optimum network prediction model, which may output predicted traffic loads for the target nodes. The predicted traffic loads can then be used to scale up or scale down the number of nodes in the cellular network. In this way, the number and use of nodes can be adjusted to balance between cellular network resource utilization and cellular user/customer experience.

After block 222, process 200 terminates or otherwise returns to a calling process to perform other actions. In various embodiments, process 200 can be repeated for different target nodes, different possible network prediction models, different target requirements, or different rankings of target requirements to determine an optimum network prediction model to employ to predict traffic loads on target nodes.

Figure 3:
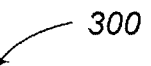
FIG. 3 shows a system diagram that describe various implementations of computing systems for implementing embodiments described herein.
Figure 3:
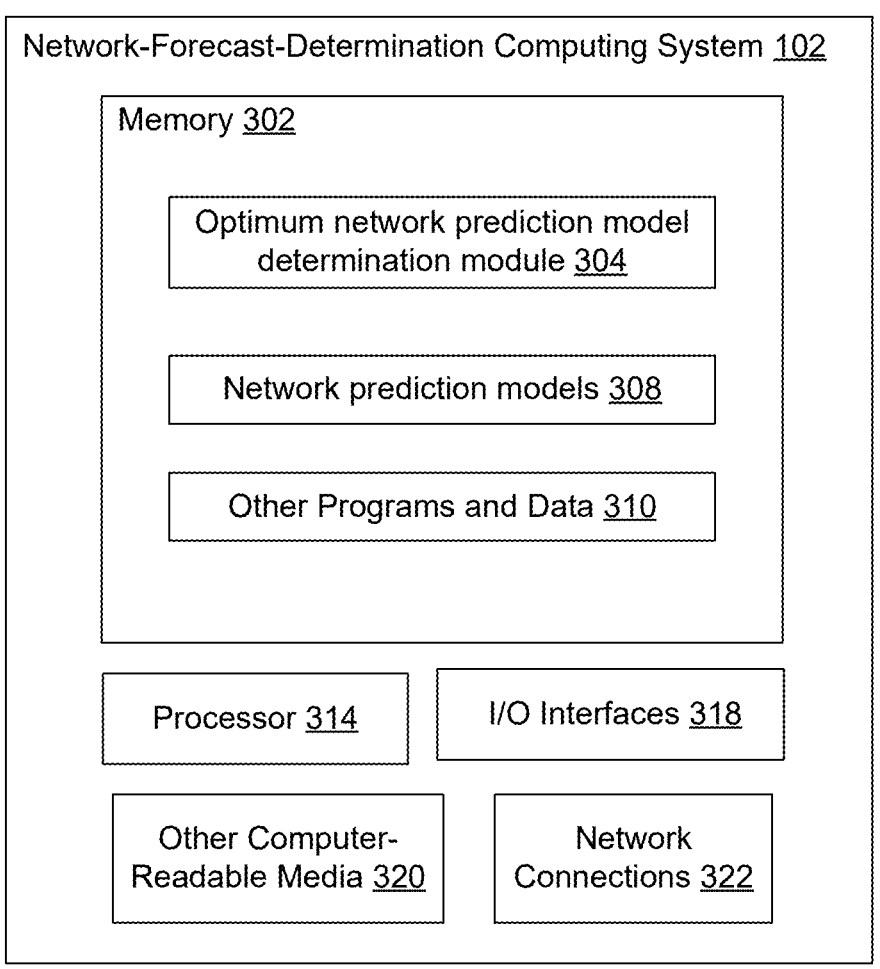

FIG. 3 shows a system diagram that describe various implementations of computing systems for implementing embodiments described herein. System 300 includes a network-forecast-determination computing system 102, similar to what is shown in FIG. 1.

The network-forecast-determination computing system 102 is a computing system or environment that determines scores a plurality of possible network prediction models to predict traffic loads on target nodes based on ranked scores for target requirements for those models, as described herein. One or more special-purpose computing systems may be used to implement the network-forecast-determination computing system 102. Accordingly, various embodiments described herein may be implemented in software, hardware, firmware, or in some combination thereof. The network-forecast-determination computing system 102 includes memory 302, processor 314, I/O interfaces 318, other computer-readable media 320, and network connections 322.

Processor 314 includes one or more processors, one or more processing units, programmable logic, circuitry, or one or more other computing components that are configured to perform embodiments described herein or to execute computer instructions to perform embodiments described herein. In some embodiments, a processor system of the network-forecast-determination computing system 102 may include a single processor 314 that operates individually to perform actions. In other embodiments, a processor system of the network-forecast-determination computing system 102 may include a plurality of processors 314 that operate to collectively perform actions, such that one or more processors 314 may operate to perform some, but not all, of such actions. Reference herein to "a processor system" of the network-forecast-determination computing system 102 refers to one or more processors 314 that individually or collectively perform actions. And reference herein to "the processor system" of the network-forecast-determination computing system 102 refers to I) a subset or all of the one or more processors 314 comprised by "a processor system" of the network-forecast-determination computing system 102 and 2) any combination of the one or more processors 314 comprised by "a processor system" of the network-forecast-determination computing system 102 and one or more other processors 314.

Memory 302 may include one or more various types of non-volatile and/or volatile storage technologies. Examples of memory 302 may include, but are not limited to, flash memory, hard disk drives, optical drives, solid-state drives, various types of random access memory (RAM), various types of read-only memory (ROM), other computer-readable storage media (also referred to as processor-readable storage media), or the like, or any combination thereof. Memory 302 may be utilized to store information, including computer-readable instructions that are utilized by processor 314 to perform actions, including embodiments described herein.

Memory 302 may have stored thereon an optimum network prediction model determination module 304, network prediction models 308, and other programs and data 310. The network prediction models 308 may include a plurality of possible network prediction models or the software to implement or generate such models. The optimum network prediction model determination module 304 is configured to select an optimum network prediction model from the network prediction models 308 to predict traffic loads on target nodes based on ranked scores for target requirements, as described herein. The other programs and data 310 may include operating systems, total scores for network prediction models 308, lists of possible target requirements, etc.

Network connections 322 are configured to communicate with other computing devices. In various embodiments, the network connections 322 include transmitters and receivers (not illustrated) to send and receive data as described herein, such as to request or obtain traffic data from nodes. I/O interfaces 318 may include one or more data input or output interfaces, video or display interfaces, or other input/output interfaces. Other computer-readable media 320 may include other types of stationary or removable computer-readable media, such as removable flash drives, external hard drives, or the like.

The following is a summarization of the claims as originally filed.

A method may be summarized as comprising: selecting a plurality of possible network prediction models to predict traffic loads on target nodes in a cellular network; selecting a plurality of target requirements in which to assess the plurality of possible network prediction models for predicting the traffic loads on the target nodes in the cellular network; ranking the plurality of target requirements for the target nodes; for each corresponding possible network prediction model of the plurality of possible network prediction models: scoring each corresponding target requirement of the plurality of target requirements for the corresponding possible network prediction model; and calculating a total score for the corresponding possible network prediction model based on the scores and ranks of each corresponding target requirement for the corresponding possible network prediction model for the target nodes; determining an optimum network prediction model from the plurality of possible network prediction models for the target nodes based on the total score of each of the plurality of possible network prediction models; and employing the optimum network prediction model to predict the traffic loads on the target nodes in the cellular network. In various embodiments, the plurality of target requirements may include at least two of accuracy of the corresponding possible network prediction model, seasonality incorporated into the corresponding possible network prediction model, manual input into the corresponding possible network prediction model, multi-variable input into the corresponding possible network prediction model, and user ease of use of the corresponding possible network prediction model.

The method may further comprise: selecting the target nodes to include at least one distributed unit from a plurality of distributed units utilized by the cellular network, wherein the plurality of distributed units provide real-time support for lower layers of a protocol stack for cellular communications across the cellular network.

The method may further comprise: selecting the target nodes to include at least one central unit from a plurality of central units utilized by the cellular network, wherein the plurality of central units provide real-time support for higher layers of a protocol stack for cellular communications across the cellular network.

The method may further comprise: selecting the target nodes to include at least one sector in which one or more cells provide access to the cellular network.

The method may further comprise: selecting the target nodes to include at least one cell of the cellular network.

The method may further comprise: selecting the target nodes to include at least one radio unit of the cellular network.

The method may determine the optimum network prediction model from the plurality of possible network prediction models by: selecting the optimum network prediction model as the corresponding possible network prediction model having a highest total score of the plurality of possible network prediction models.

The method may determine the optimum network prediction model from the plurality of possible network prediction models by: identifying the optimum network prediction model based on a comparison of the total score of each of the plurality of possible network prediction models, wherein the optimum network prediction model has a highest total score.

The method may further comprise: selecting other target nodes in the cellular network in which to predict traffic loads on the other target nodes; re-ranking the plurality of target requirements for the other target nodes; for each corresponding possible network prediction model of the plurality of possible network prediction models, calculating a second total score for the corresponding possible network prediction model based on the scores and re-ranks of each corresponding target requirement for the corresponding possible network prediction model for the other target nodes; determining a second optimum network prediction model from the plurality of possible network prediction models for the other target nodes based on the second total score of each of the plurality of possible network prediction models; and employing the second optimum network prediction model to predict the traffic loads on the other target nodes in the cellular network.

A computing device may be summarized as comprising: a memory configured to store computer instructions; and a processor system configured to execute the computer instructions to: select one or more target nodes in a wireless network; select a plurality of possible network prediction models to predict traffic loads on the one or more target nodes; select a plurality of target requirements in which to compare the plurality of possible network prediction models for predicting the traffic loads on the one or more target nodes in the cellular network; rank the plurality of target requirements for the target nodes; for each corresponding possible network prediction model of the plurality of possible network prediction models: score each corresponding target requirement of the plurality of target requirements for the corresponding possible network prediction model; and calculate a total score for the corresponding possible network prediction model based on the scores and ranks of each corresponding target requirement for the corresponding possible network prediction model for the target nodes; determine an optimum network prediction model from the plurality of possible network prediction models for the target nodes based on the total score of each of the plurality of possible network prediction models; and employ the optimum network prediction model to predict the traffic loads on the target nodes in the cellular network. In various embodiments, the plurality of target requirements may include at least two of accuracy of the corresponding possible network prediction model, seasonality incorporated into the corresponding possible network prediction model, manual input into the corresponding possible network prediction model, multi-variable input into the corresponding possible network prediction model, and user ease of use of the corresponding possible network prediction model.

The processor system of the computing device may be configured to execute the computer instructions further to: select the target nodes to include at least one distributed unit from a plurality of distributed units utilized by the cellular network, wherein the plurality of distributed units provide real-time support for lower layers of a protocol stack for cellular communications across the cellular network.

The processor system of the computing device may be configured to execute the computer instructions further to: select the target nodes to include at least one central unit from a plurality of central units utilized by the cellular network, wherein the plurality of central units provide real-time support for higher layers of a protocol stack for cellular communications across the cellular network.

The processor system of the computing device may be configured to execute the computer instructions further to: select the target nodes to include at least one sector in which one or more cells provide access to the cellular network.

The processor system of the computing device may be configured to execute the computer instructions further to: select the target nodes to include at least one cell of the cellular network.

The processor system of the computing device may be configured to execute the computer instructions further to: select the target nodes to include at least one radio unit of the cellular network.

The processor system of the computing device may determine the optimum network prediction model from the plurality of possible network prediction models by being configured to execute the computer instructions further to: select the optimum network prediction model as the corresponding possible network prediction model having a highest total score of the plurality of possible network prediction models.

The processor system of the computing device may be configured to execute the computer instructions further to: select other target nodes in the cellular network in which to predict traffic loads on the other target nodes; re-rank the plurality of target requirements for the other target nodes; for each corresponding possible network prediction model of the plurality of possible network prediction models, calculate a second total score for the corresponding possible network prediction model based on the scores and re-ranks of each corresponding target requirement for the corresponding possible network prediction model for the other target nodes; determine a second optimum network prediction model from the plurality of possible network prediction models for the other target nodes based on the second total score of each of the plurality of possible network prediction models; and employ the second optimum network prediction model to predict the traffic loads on the other target nodes in the cellular network.

A non-transitory computer-readable storage medium may be summarized as storing instructions that, when executed by a processor in a computing system, cause the processor to perform actions, the actions comprising: ranking a plurality of target requirements in which to assess a plurality of possible network prediction models for predicting traffic loads on target nodes in a cellular network; for each corresponding possible network prediction model of the plurality of possible network prediction models: scoring each corresponding target requirement of the plurality of target requirements for the corresponding possible network prediction model; and calculating a total score for the corresponding possible network prediction model based on the scores and ranks of each corresponding target requirement for the corresponding possible network prediction model for the target nodes; and employing an optimum network prediction model from the plurality of possible network prediction models to predict the traffic loads on the target nodes in the cellular network, the optimum network prediction model having a highest total score.

The various embodiments described above can be combined to provide further embodiments. All of the U.S. patents, U.S. patent application publications, and U.S. patent applications referred to in this specification are incorporated herein by reference, in their entirety. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:

selecting a plurality of possible network prediction models to predict traffic loads on target nodes in a cellular network;

selecting a plurality of target requirements in which to assess the plurality of possible network prediction models for predicting the traffic loads on the target nodes in the cellular network;

for each corresponding possible network prediction model of the plurality of possible network prediction models, scoring each corresponding target requirement of the plurality of target requirements for the corresponding possible network prediction model;

selecting a first set of target nodes in the cellular network;

for the first set of target nodes:

ranking the plurality of target requirements in which to assess the plurality of possible network prediction models with respect to the first set of target nodes;

for each corresponding possible network prediction model of the plurality of possible network prediction models, calculating a first total score for the corresponding possible network prediction model based on the scores and the ranks of each corresponding target requirement for the corresponding possible network prediction model for the first set of target nodes;

determining a first optimum network prediction model from the plurality of possible network prediction models for the first set of target nodes based on the first total score of each of the plurality of possible network prediction models; and employing the first optimum network prediction model to predict the traffic loads on the first set of target nodes in the cellular network;

selecting a second set of target nodes in the cellular network, wherein the second set of target nodes is different from the first set of target nodes; and for the second set of target nodes:

re-ranking the plurality of target requirements in which to assess the plurality of possible network prediction models with respect to the second set of target nodes;

for each corresponding possible network prediction model of the plurality of possible network prediction models, calculating a second total score for the corresponding possible network prediction model based on the scores and re-ranks of each corresponding target requirement for the corresponding possible network prediction model for the second set of target nodes;

determining a second optimum network prediction model from the plurality of possible network prediction models for the second set of target nodes based on the second total score of each of the plurality of possible network prediction models; and employing the second optimum network prediction model to predict the traffic loads on the second set of target nodes in the cellular network.

2. The method of claim 1, wherein the plurality of target requirements includes at least two of accuracy of the corresponding possible network prediction model, seasonality incorporated into the corresponding possible network prediction model, manual input into the corresponding possible network prediction model, multi-variable input into the corresponding possible network prediction model, and user ease of use of the corresponding possible network prediction model.

3. The method of claim 1, wherein selecting the first set of target nodes further comprising:

selecting the first set of target nodes to include at least one distributed unit from a plurality of distributed units utilized by the cellular network, wherein the plurality of distributed units provide real-time support for lower layers of a protocol stack for cellular communications across the cellular network.

4. The method of claim 1, wherein selecting the first set of target nodes further comprising:

selecting the first set of target nodes to include at least one central unit from a plurality of central units utilized by the cellular network, wherein the plurality of central units provide real-time support for higher layers of a protocol stack for cellular communications across the cellular network.

5. The method of claim 1, wherein selecting the first set of target nodes further comprising:

selecting the first set of target nodes to include at least one sector in which one or more cells provide access to the cellular network.

6. The method of claim 1, wherein selecting the first set of target nodes further comprising:

selecting the first set of target nodes to include at least one cell of the cellular network.

7. The method of claim 1, wherein selecting the first set of target nodes further comprising:

selecting the first set of target nodes to include at least one radio unit of the cellular network.

8. The method of claim 1, wherein determining the first optimum network prediction model from the plurality of possible network prediction models comprises:

selecting the first optimum network prediction model as the corresponding possible network prediction model having a highest first total score of the plurality of possible network prediction models.

9. The method of claim 1, wherein determining the first optimum network prediction model from the plurality of possible network prediction models comprises:

identifying the first optimum network prediction model based on a comparison of the first total score of each of the plurality of possible network prediction models, wherein the first optimum network prediction model has a highest first total score.

10. A computing device, comprising:

a memory configured to store computer instructions; and a processor system configured to execute the computer instructions to:

select a plurality of possible network prediction models to predict traffic loads on target nodes in a cellular network;

select a plurality of target requirements in which to compare the plurality of possible network prediction models for predicting the traffic loads on the target nodes in the cellular network;

for each corresponding possible network prediction model of the plurality of possible network prediction models, score each corresponding target requirement of the plurality of target requirements for the corresponding possible network prediction model;

select a first set of target nodes in the cellular network;

for the first set of target nodes:

select a first rank for the plurality of target requirements in which to assess the plurality of possible network prediction models with respect to the first set of target nodes;

for each corresponding possible network prediction model of the plurality of possible network prediction models, calculate a first total score for the corresponding possible network prediction model based on the scores and the first rank of each corresponding target requirement for the corresponding possible network prediction model for the first set of target nodes;

determine a first optimum network prediction model from the plurality of possible network prediction models for the first set of target nodes based on the first total score of each of the plurality of possible network prediction models; and employ the first optimum network prediction model to predict the traffic loads on the first set of target nodes in the cellular network;

select a second set of target nodes in the cellular network, wherein the second set of target nodes is different from the first set of target nodes; and for the second set of target nodes:

select a second rank for the plurality of target requirements in which to assess the plurality of possible network prediction models with respect to the second set of target nodes;

for each corresponding possible network prediction model of the plurality of possible network prediction models, calculate a second total score for the corresponding possible network prediction model based on the scores and the second rank of each corresponding target requirement for the corresponding possible network prediction model for the second set of target nodes;

determine a second optimum network prediction model from the plurality of possible network prediction models for the second set of target nodes based on the second total score of each of the plurality of possible network prediction models; and employ the second optimum network prediction model to predict the traffic loads on the second set of target nodes in the cellular network.

11. The computing device of claim 10, wherein the plurality of target requirements includes at least two of accuracy of the corresponding possible network prediction model, seasonality incorporated into the corresponding possible network prediction model, manual input into the corresponding possible network prediction model, multi-variable input into the corresponding possible network prediction model, and user ease of use of the corresponding possible network prediction model.

12. The computing device of claim 10, wherein the processor system selects the first set of target nodes by being configured to execute the computer instructions further to:

select the first set of target nodes to include at least one distributed unit from a plurality of distributed units utilized by the cellular network, wherein the plurality of distributed units provide real-time support for lower layers of a protocol stack for cellular communications across the cellular network.

13. The computing device of claim 10, wherein the processor system selects the first set of target nodes by being configured to execute the computer instructions further to:

select the first set of target nodes to include at least one central unit from a plurality of central units utilized by the cellular network, wherein the plurality of central units provide real-time support for higher layers of a protocol stack for cellular communications across the cellular network.

14. The computing device of claim 10, wherein the processor system selects the first set of target nodes by being configured to execute the computer instructions further to:

select the first set of target nodes to include at least one sector in which one or more cells provide access to the cellular network.

15. The computing device of claim 10, wherein the processor system selects the first set of target nodes by being configured to execute the computer instructions further to:

select the first set of target nodes to include at least one cell of the cellular network.

16. The computing device of claim 10, wherein the processor system selects the first set of target nodes by being configured to execute the computer instructions further to:

select the first set of target nodes to include at least one radio unit of the cellular network.

17. The computing device of claim 10, wherein the processor system determines the first optimum network prediction model from the plurality of possible network prediction models by being configured to execute the computer instructions further to:

select the first optimum network prediction model as the corresponding possible network prediction model having a highest first total score of the plurality of possible network prediction models.

18. A non-transitory computer-readable storage medium that stores instructions that, when executed by a processor in a computing system, cause the processor to perform actions, the actions comprising:

for each corresponding possible network prediction model of a plurality of possible network prediction models, scoring each corresponding target requirement of a plurality of target requirements for the corresponding possible network prediction model;

for a first set of target nodes in a cellular network:

ranking the plurality of target requirements in which to assess the plurality of possible network prediction models for predicting traffic loads on the first set of target nodes;

for each corresponding possible network prediction model of the plurality of possible network prediction models, calculating a first total score for the corresponding possible network prediction model based on the scores and the ranking of each corresponding target requirement for the corresponding possible network prediction model for the first set of target nodes; and employing a first optimum network prediction model from the plurality of possible network prediction models to predict the traffic loads on the first set of target nodes in the cellular network, the first optimum network prediction model having a highest first total score; and for a second set of target nodes in the cellular network, the second set of target nodes being different from the first set of target nodes:

re-ranking the plurality of target requirements in which to assess the plurality of possible network prediction models for predicting traffic loads on the second set of target nodes;

for each corresponding possible network prediction model of the plurality of possible network prediction models, calculating a second total score for the corresponding possible network prediction model based on the scores and the re-ranking of each corresponding target requirement for the corresponding possible network prediction model for the second set of target nodes; and employing a second optimum network prediction model from the plurality of possible network prediction models to predict the traffic loads on the second set of target nodes in the cellular network, the second optimum network prediction model having a highest second total score.

* * * * *